United States Patent
Vorobyov et al.

(10) Patent No.: US 10,229,070 B2
(45) Date of Patent: Mar. 12, 2019

(54) COMPUTER-IMPLEMENTED METHOD AND A SYSTEM FOR ENCODING A HEAP APPLICATION MEMORY STATE USING SHADOW MEMORY

(71) Applicant: COMMISSARIAT A L'ENERGIE ATOMIQUE ET AUX ENERGIES ALTERNATIVES, Paris (FR)

(72) Inventors: Kostyantyn Vorobyov, Palaiseau (FR); Nikolay Kosmatov, Saint-Cyr-l'Ecole (FR); Julien Signoles, Fontenay-aux-Roses (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 25 days.

(21) Appl. No.: 15/706,502

(22) Filed: Sep. 15, 2017

(65) Prior Publication Data
US 2018/0089109 A1 Mar. 29, 2018

(30) Foreign Application Priority Data
Sep. 27, 2016 (EP) .................................... 16306236

(51) Int. Cl.
*G06F 12/00* (2006.01)
*G06F 12/14* (2006.01)
(Continued)

(52) U.S. Cl.
CPC ...... *G06F 12/1458* (2013.01); *G06F 11/3636* (2013.01); *G06F 11/3644* (2013.01);
(Continued)

(58) Field of Classification Search
CPC ............. G06F 12/1458; G06F 11/3636; G06F 11/3644; G06F 12/1416; G06F 12/023;
(Continued)

(56) References Cited

U.S. PATENT DOCUMENTS 6,826,672 B1 11/2004 Brown et al.
7,277,999 B1 * 10/2007 Agesen ............... G06F 12/1027
711/150

(Continued)

OTHER PUBLICATIONS

Arvid Jakobsson et al., "Fast as a shadow, expressive as a tree," Proceedings of the 30th Annual ACM Symposium on Applied Computing, Apr. 13, 2015, pp. 1765-1772, XP055354832.

(Continued)

*Primary Examiner* — Mark A Giardino, Jr.
(74) *Attorney, Agent, or Firm* — Baker & Hostetler LLP

(57) ABSTRACT

A computer-implemented method for encoding an application memory that a program, executed on a computer, has access to, using a shadow memory corresponding to the application memory, the method comprises: creating and initializing a shadow memory divided into segments, each segment in the application memory being mapped to a corresponding segment in the shadow memory, for each memory block in the application memory that the program allocates, encoding a corresponding shadow memory block, in the shadow memory, by: defining a meta segment preceding the first segment of the memory block in the application memory, and a corresponding shadow meta segment in the shadow memory block, writing in the shadow meta segment a first value indicative of the size of the memory block, writing, in each subsequent segment of the shadow memory block, a second value indicative of the offset between the segment and the first segment of the shadow memory block.

20 Claims, 9 Drawing Sheets

(51) Int. Cl.
  G06F 11/36 (2006.01)
  G06F 12/02 (2006.01)
  G06F 21/52 (2013.01)
  G06F 21/54 (2013.01)
  G06F 13/00 (2006.01)
  G06F 13/28 (2006.01)
(52) U.S. Cl.
  CPC ........ G06F 12/023 (2013.01); G06F 12/1416 (2013.01); G06F 12/1441 (2013.01); G06F 21/52 (2013.01); G06F 21/54 (2013.01); G06F 2212/1052 (2013.01)
(58) Field of Classification Search
  CPC ...... G06F 12/1441; G06F 21/52; G06F 21/54; G06F 2212/1052
  See application file for complete search history.

(56) References Cited

U.S. PATENT DOCUMENTS

| | | | |
|---|---|---|---|
| 8,762,797 B2 | 6/2014 | Serebryany et al. | |
| 2002/0091841 A1* | 7/2002 | Beukema | G06F 12/145 709/229 |
| 2003/0126590 A1 | 7/2003 | Burrows et al. | |
| 2004/0098369 A1* | 5/2004 | Elzur | G06F 12/10 |
| 2011/0231826 A1* | 9/2011 | Narasimhan | G06F 11/3636 717/128 |

OTHER PUBLICATIONS

R. Hastings et al., "Purify: Fast detection of memory leaks and access errors," In Proceedings of the Winter USENIX Conference, pp. 125-136, Jan. 1992.
J. Seward et al., "Using valgrind to detect undefined value errors with bit-precision," In Proceedings of the USENIX Annual Technical Conference, pp. 17-30, USENIX, 2005.
W. Cheng et al., "Tainttrace: Efficient flow tracing with dynamic binary rewriting," In Proceedings of the IEEE Symposium on Computers and Communications, pp. 749-754, IEEE Computer Society, Jun. 2006.
D. Bruening et al., "Practical memory checking with Dr. Memory," In Proceedings of the Annual IEEE / ACM International Symposium on Code Generation and Optimization, CGO '11, pp. 213-223, Washington, DC, USA, 2011. IEEE Computer Society.
K. Serebryany et al., "AddressSanitizer: A fast address sanity checker," In Proceedings of the USENIX Annual Technical Conference, pp. 309-319, USENIX Association, Jun. 2012.
Q. Zhao et al., "Umbra: Efficient and scalable memory shadowing," In Proceedings of the International Symposium on Code Generation and Optimization, pp. 22-31, ACM, Apr. 2010.

* cited by examiner

COMPUTER-IMPLEMENTED METHOD AND A SYSTEM FOR ENCODING A HEAP APPLICATION MEMORY STATE USING SHADOW MEMORY

CROSS-REFERENCE TO RELATED APPLICATIONS

This application claims priority to foreign European patent application No. EP 16306236.7, filed on Sep. 27, 2016, the disclosure of which is incorporated by reference in its entirety.

FIELD OF THE INVENTION

The present invention relates to the field of runtime analysis of an application's memory state. In particular, the invention relates to the field of memory shadowing techniques which associate addresses from the application's memory to values stored in a disjoint memory region (or regions) called shadow memory. An object of the invention is a method for encoding an application's memory state using shadow memory.

The invention also focuses on using shadow memory to detect attempts by a computer program to access memory that is not properly allocated for such an access.

The invention also consists in a computer-implemented method and a system for detecting illegal memory accesses by a computer program, where memory access denotes reading a value from a memory location or writing a value to it.

BACKGROUND

Computer programs typically execute on computers, or equivalent systems that comprise a processor and a memory. A computer program executed by an operating system can be represented by one or several processes. The physical memory is usually managed by a computer's operating system in order to provide each process with a virtual memory space. The virtual memory space is accessed by applications to write and read values. Each of the processes has its own virtual memory space. Alternately, computer memory can be managed directly, without using a virtual memory. Memory is organized into locations, each having a unique address. Typically, memory is represented by a contiguous array of cells with byte-level addressing.

Typically, a virtual memory space of an executing process is divided into several memory segments used for different purposes. The segments are disjoint and represented by contiguous memory regions.

Stack memory is a memory segment generally assigned to saving local variables automatically allocated and de-allocated by programs at runtime. As such, stack memory is reserved for automatic memory allocation at runtime. Also, memory is allocated in memory blocks.

Heap memory is usually the largest part of the memory and is reserved for dynamically allocated memory blocks. Typically, a program can dynamically allocate memory by calling a dedicated procedure. An example of such a function is the malloc function in the C programming language. When the allocated memory is no longer required, the program can also call an operating system procedure to deallocate the allocated memory so that it can be re-used by the program.

The invention applies more particularly to heap memory.

At a source level of programming languages heap memory can be written to or read from using pointers: special variables containing addresses of memory locations. Some pointer p is said to point to a memory block B if p stores an address from B.

A problem may arise if a program reads from or writes to a memory location that was not properly allocated (e.g., via malloc for example). Another problem may arise when the program accesses an allocated memory location through a pointer which does not point to a memory block containing that location.

Problems mentioned in the above paragraph are instances of improper use of memory and relate to a broader class of problems commonly known as memory safety, which includes (but not limited to) such issues as access to unallocated memory, memory leaks, illegal dereferences, double free errors, reading uninitialized data. Consequences of such issues differ in severity and range from inconsistent behaviors to issues compromising security of applications and program crashes. It is therefore important to detect such memory violations.

It is also a general purpose of the invention to provide a shadow-state encoding mechanism that allows analyzing the memory state of an executing program at runtime. In particular, tracking allocated memory can be performed during a program's execution.

Memory shadowing is a general technique for tracking properties of an application's data at runtime. In its typical use memory shadowing associates addresses from the application's memory to shadow values, stored in a disjoint memory region (or regions) called shadow memory. During a program's execution shadow values act as metadata that store information about the memory addresses they are mapped to.

Memory shadowing has many applications, one of them is memory analysis where shadow values are used to track memory and detect safety problems. Examples of such existing mechanisms are described in particular in references [1] and [2].

Shadow state encoding refers to the process of designing the structure of shadow values and their interpretation. The prior art contains shadow state encoding mechanisms that vary across different tools. Some implementations use shadow values to store bit-level states of the memory locations they aim to characterize.

Reference [3] discloses a tool using shadow state encoding focused on detection of information leakage at runtime. The proposed method uses one bit to tag each addressable byte from an application's memory as public or private. Another method disclosed in reference [4] relates to a memory debugger used to shadow one byte by two bits that indicate whether that byte is allocated and initialized. Reference [2] introduces a method that uses bit-to-bit shadowing to track initialization status of every bit. Reference [5] proposes to customize memory allocation to ensure that memory blocks are allocated at an 8-byte boundary, and to track aligned 8-byte sequences by one shadow byte. American patent U.S. Pat. No. 8,762,797 also describes the same method as reference [5].

The shadow state encoding methods of prior art have been proven useful for tracking memory at bit-level and byte-level. These methods, however, are limited in their capacity to identify properties with respect to memory blocks. More particularly, the existing tools using shadow memory do not capture enough metadata to identify the bounds and the length of a memory block a given address belongs to. Therefore, existing methods cannot detect a memory violation concerning an access to an allocated memory location through a pointer which does not point to a memory block the location belongs to.

SUMMARY OF THE INVENTION

The present invention is proposed in the view of the above problem and relates to the use of shadow memory during runtime memory-safety analysis of computer programs. The invention aims at resolving the limitations of the prior art's shadow state encoding methods with a new method that allows tracking boundaries of allocated memory blocks while still capturing byte-level properties. This is achieved with a particular shadow memory encoding scheme which captures boundaries and lengths of allocated memory blocks. Analyzing the content of the shadow memory allows detecting memory safety issues.

In particular, for a memory location given by its address a, the proposed invention allows computing the following information regarding the address a: whether a has been allocated, whether a has been initialized, the start (base) address of the memory block a belongs to, the byte-length of the memory block a belongs to, the byte offset of a within its block. Such information allows for detection of specific memory safety issues at runtime.

The invention relates to a computer-implemented method for encoding an application memory that a program, executed on a computer, has access to, using a shadow memory corresponding to the application memory, the method comprising:

creating and initializing a shadow memory divided into a plurality of segments, each segment in the application memory being mapped to a corresponding segment in the shadow memory, for each memory block in the application memory that the program allocates, encoding a corresponding shadow memory block, in the shadow memory, by:
  defining a meta segment preceding the first segment of the memory block in the application memory, and a corresponding shadow meta segment in the shadow memory block,
  writing in the shadow meta segment a first value indicative of the size of the memory block,
  writing, in each subsequent segment of the shadow memory block, a second value indicative of the offset between the segment and the first segment of the shadow memory block.

In a particular embodiment of the invention, the second value is indicative of the offset from the base address of the shadow memory block to the segment's base address.

In a particular embodiment of the invention, a meta segment in the application memory is unallocated.

In a particular embodiment of the invention, the shadow memory is initialized with base values being positive or zero.

In a particular embodiment of the invention, the method comprises writing a base value in a first part of the shadow meta segment and the first value indicative of the size of the memory block in a second part of the shadow meta segment.

In a particular embodiment of the invention, the base value is zero and the second value is equal to the offset from the base address of the shadow memory block to the segment's base address incremented by one.

In a particular embodiment of the invention, the second value is written in a first part of a shadow segment having the same size as the first part of a meta segment.

In a particular embodiment of the invention, the method comprises writing, in a second part of each shadow segment, a third value indicative of the initialization of all bytes of the corresponding segment in the application memory.

In a particular embodiment of the invention, the application memory comprises heap memory.

In a particular embodiment of the invention, the method comprises writing base values to the first part of each segment in a shadow memory block when a corresponding memory block in the application memory is de-allocated by the program.

Another object of the invention is a computer-implemented method for detecting illegal memory access by a program executed on a computer having a processor and an application memory, the method comprising:

executing the method for encoding shadow memory according to any embodiment of the invention and, when the program accesses to an address in an application memory block, analyzing the shadow memory block to determine if the access is illegal.

In a particular embodiment of the invention, analyzing the shadow memory block to determine if the access is illegal comprises determining the length of the memory block and the offset of the address within the memory block.

In a particular embodiment of the invention, determining if the access is illegal comprises comparing the offset of the address within the memory block and the length of the memory block.

In a particular embodiment of the invention, the address is equal to a base address plus an offset value and determining if the access is illegal comprises comparing the offset of the base address within the memory block plus the length of the memory block with the offset value.

In a particular embodiment of the invention, determining if the access is illegal comprises reading the value of the segment offset in the shadow segment to which the address belongs and comparing said value with a base value.

In a particular embodiment of the invention, determining the length of the memory block comprises:
  Determining the offset of the address relative to the base address of the segment it belongs to,
  Determining the base address of the segment to which the address belongs,
  Determining the base address of the corresponding shadow segment,
  Determining the segment offset by reading a value at the base address of the shadow segment,
  Determining the base address of the shadow memory block,
  Determining the length of the memory block by reading the shadow meta segment of the shadow memory block.

In a particular embodiment of the invention, determining the offset of the address within the memory block comprises:
  Determining the offset of the address relative to the base address of the segment it belongs to,
  Determining the base address of the segment to which the address belongs,
  Determining the base address of the corresponding shadow segment,
  Determining the segment offset by reading a value at the base address of the shadow segment,
  Determining the base address of the shadow memory block,
  Determining the base address of the corresponding memory block, Determining the offset of the address within the memory block.

In a particular embodiment of the invention, the method comprises determining if the address is initialized by evaluating the third value in the second part of the shadow segment corresponding to the segment to which the address belongs.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, illustrate some embodiments of the invention.

DETAILED DESCRIPTION

Figure 1:
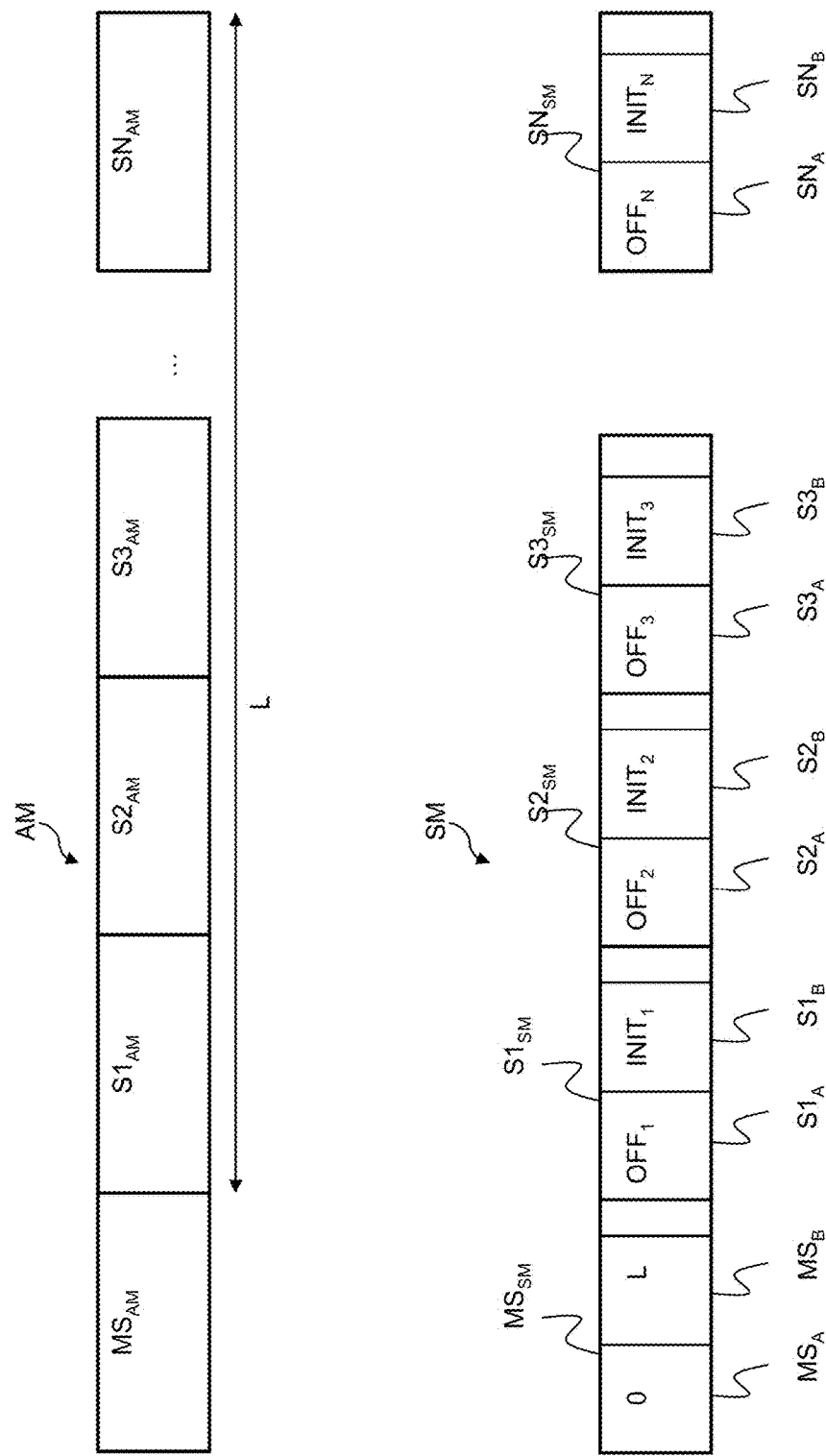
FIG. 1 shows a representation of a heap memory block and a corresponding shadow memory block according to an embodiment of the invention.

The method according to the invention applies to computer programs that manage memory through dynamic allocation in a virtual memory space of a computer process, where random access memory is represented by a contiguous array of memory cells with byte-level addressing.

The following paragraphs give general definitions of terms and concepts that will be referred to throughout the description.

A virtual memory space of a computer process is linear and segmented, consisting of text, stack, heap and potentially other segments. The order of segments is unspecified, however each segment is represented by a contiguous memory region disjoint with any other segment. This document further refers to a heap segment within the virtual memory space of a computer process as to a program's heap.

Byte-width of a memory address (denoted $A_W$) refers to the number of bytes sufficient to uniquely represent any memory address in the virtual memory space of a process. Typically $A_W$ is 4 bytes in x86 architecture with 32-bit instruction set.

At runtime a program allocates memory in units referred to as memory blocks. A memory block is a contiguous memory region described by its start and end addresses. The start address of a memory block, also referred to as its base address, is less than or equal to its end address. The length of the memory block is the difference between the block's end and base addresses increased by 1. A memory address a is said to belong to a memory block B if a is greater than or equal to the base address of B and less than or equal to the end address of B. The byte offset of an address a belonging to a memory block B is given by the difference between a and the base address of B. A memory block B is said to be aligned at a boundary of N, if the base address of B is divisible by N. A memory block B is said to be padded with N bytes if its base address is preceded by at least N bytes of unusable memory.

At any given moment, memory allocation of an executing computer program consists of disjoint memory blocks allocated statically, dynamically or automatically. Static memory allocation refers to allocation of memory blocks at compile-time and typically represents global variables. Automatically allocated memory refers to memory blocks allocated on a program's stack at runtime. In a typical program stack-allocated memory blocks are unaligned or aligned at a boundary of two and placed one after another. The minimal length of a memory block allocated either statically or automatically is one byte.

Dynamically allocated memory refers to memory blocks allocated on a program's heap at runtime. Let a segment be a memory block of a fixed length $sz_{seg}$ but not less than a doubled byte-width of a memory address (e.g., 8 bytes in x86 architecture with 32-bit instruction set). The base address of each heap memory block is a multiple of $sz_{seg}$ and each allocated heap memory block is padded with $sz_{seg}$ bytes.

The invention generally relates to dynamically allocated memory and uses the known concept of shadow memory to track metadata concerning application memory allocation. In the following description, expression "application memory" is used to refer to memory used by a program which can access it to write and read values. Expression "shadow memory" designates memory used to store metadata about allocation of application memory. Shadow memory cannot be used by an application.

Shadow memory is represented by one or several contiguous memory regions disjoint with the application memory space used by an executing program. The shadowing mapping scheme can be either a direct mapping scheme (known as DMS), where a single memory space is used to shadow the entire address space, or a segmented mapping scheme (known as SMS) that segregates a program's address space into shadow segments.

Generally, there is a mapping correspondence between application memory and shadow memory. A mapping function is used to translate an address from application memory to shadow memory and vice versa. Reference [6] gives an example of a shadowing mapping scheme that can be used to perform such a mapping function.

For the purpose of this description, it is assumed that translation from an application memory address addr to a shadow memory address sh is given by the mapping Shadow(addr)=sh, and conversion from sh to addr is given by the mapping Uspace(sh)=addr.

Figure 2:
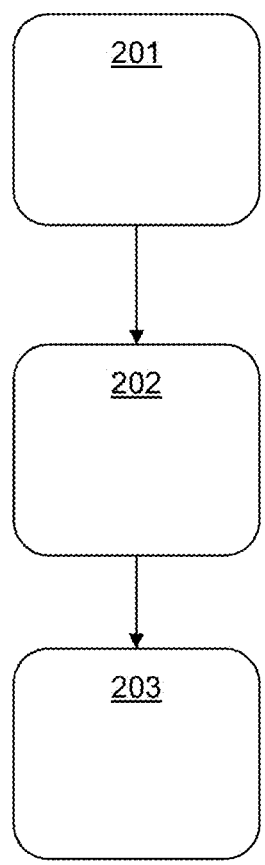
FIG. 2 shows a flowchart of a method for encoding shadow memory according to an embodiment of the invention.

FIGS. 1 and 2 show a method for encoding shadow memory according to a first embodiment of the invention.

FIG. 1 shows a representation of an application memory block AM and a corresponding shadow memory block SM. FIG. 2 shows a flowchart of a method for encoding shadow memory SM according to an embodiment of the invention.

A shadow memory block SM is used to store metadata concerning allocation or other information related to an application memory block AM. As such, the application memory block AM and the shadow memory block SM can have the same size.

According to an embodiment of the invention, application memory space and shadow memory space are both represented using segments of fixed identical size $sz_{seg}$. The size of a shadow segment is a parameter of the invention but cannot be less than the doubled byte-width of a memory address (i.e., $2*A_W$). Therefore, in the case of a X86 architecture with a 32-bit instruction set, $A_W$ is 4 bytes and the size of a segment $sz_{seg}$ is not less than 8 bytes. According to an alternative embodiment, the segments in the shadow memory space are scaled. That is, the size of a segment in the shadow memory space, differ from the size of a corresponding segment in the application memory space. In particular, to limit the space occupied by shadow memory, a shadow memory segment can be smaller than an application memory segment.

All shadow memory segments are initialized (i.e., filled with) with base values. According to a preferred embodiment, a base value is zero but it can be any value.

When a computer program allocates an application memory block AM, a software tool or instrument according to the invention executes the encoding method depicted in FIG. 2 to encode a corresponding shadow memory block SM in the shadow memory space.

In the example shown via FIG. 1, an application memory block AM comprises N segments, $S1_{AM}$, $S2_{AM}$, $S3_{AM}$, ..., $SN_{AM}$. The corresponding shadow memory block SM also comprises N segments $S1_{SM}$, $S2_{SM}$, $S3_{SM}$, ..., $SN_{SM}$. Each segment in the shadow memory block SM is used to track changes in a corresponding segment of the application memory block AM.

In a first step 201 of the method depicted in FIG. 2, the segment $MS_{AM}$, immediately preceding the first segment $S1_{AM}$ in the application memory block AM, is reserved as unallocated memory. That is, the memory space occupied by the segment $MS_{AM}$ cannot be used by a program. $MS_{AM}$ is further referred to as the meta segment.

The corresponding segment $MS_{SM}$ in the shadow memory is also called a meta segment and is used to store metadata related to the application memory block AM. Precisely, a first part $MS_A$ of the meta-segment $MS_{SM}$ is filled with a base value and the size L of the application memory block AM is written in a second part $MS_B$ of the meta-segment $MS_{SM}$. The first part $MS_A$ and the second part $MS_B$ are contiguous. The first part $MS_A$ starts at the base address of the meta-segment $MS_{SM}$. The size L is the size of the block comprising the segments $S1_{AM}$, $S2_{AM}$, $S3_{AM}$, ..., $SN_{AM}$ that are effectively allocated without the meta-segment $MS_{AM}$. In alternative embodiments, the size L of the memory block can be replaced by any information indicative of the size L of the memory block. For example, it can be a value from which the size L can be directly deduced. This information can also be encoded or encrypted to give access to only authorized users.

In a second step 202 of the method, the first parts $S1_A$, $S2_A$, $S3_A$, ..., $SN_A$ of segments $S1_{SM}$, $S2_{SM}$, $S3_{SM}$, ..., $SN_{SM}$ of the shadow memory block SM capture values $OFF_1$, $OFF_2$, $OFF_3$, ..., $OFF_N$, which encode offsets between the base addresses of the segments $S1_{SM}$, $S2_{SM}$, $S3_{SM}$, ..., $SN_{SM}$ and the base address of the shadow memory block SM. Such offsets are further referred to as shadow segment offsets. A shadow segment offset of some segment $SN_{SM}$ in the shadow memory block SM is the difference between the base address of the segment $SN_{SM}$ and the base address of the shadow memory block SM. The first segment $S1_{SM}$ of the shadow memory block SM is also called the base segment. The first parts of $S1_A$, $S2_A$, $S3_A$, ..., $SN_A$ start at the base addresses of segments $S1_{SM}$, $S2_{SM}$, $S3_{SM}$, ..., $SN_{SM}$.

If a base value is chosen to be zero, then the values $OFF_1$, $OFF_2$, $OFF_3$, ..., $OFF_N$ are given by the values of the respective shadow segment offsets incremented by one. For instance, $OFF_3$ is given by the difference between the base of the third segment in the shadow memory block SM and the base address of SM. Such choice of encoding $OFF_1$, $OFF_2$, $OFF_3$, ..., $OFF_N$ is to differentiate between a base value of zero (which refers to a shadow segment mapped to the unallocated application memory) and the first segment shadow offset (also zero).

If the base value is chosen to be strictly positive, then the values $OFF_1$, $OFF_2$, $OFF_3$, ..., $OFF_N$ are given by the values of respective shadow segment offsets incremented by the base value incremented by one. Otherwise, if the base value is chosen to be strictly negative, the values $OFF_1$, $OFF_2$, $OFF_3$, ..., $OFF_N$ are given by the shadow segment offsets themselves. If a value other than zero is used to represent the base value, then the minimal size of a segment in the shadow memory should be increased to allow for storage of such values.

According to an embodiment of the invention, the size of the first part of any shadow segment is fixed and equals to the size of the first part of the meta segment. The first part of the meta-segment is filled with a base value. This is to keep the same structure for all segments in the shadow memory space.

According to an embodiment of the invention, the size of the first part of any segment, including the meta-segment, is equal to the byte-width $A_W$ of an address. Generally, the size of the first part of any segment is not less than the byte-width $A_W$.

According to an embodiment of the invention, in a third step 203 of the method, a second part $S1_B$, $S2_B$, $S3_B$, ..., $SN_B$ of the segments $S1_{SM}$, $S2_{SM}$, $S3_{SM}$, ..., $SN_{SM}$ of the shadow memory block is used to capture per-byte initialization of the corresponding segment in the application memory block. The first parts $S1_A$, $S2_A$, $S3_A$, ..., $SN_A$ and the second parts $S1_B$, $S2_B$, $S3_B$, ..., $SN_B$ are contiguous in each segment. In other words, the second parts of segments $S1_B$, $S2_B$, $S3_B$, ..., $SN_B$ of the shadow memory block SM store information $INIT_1$, $INIT_2$, $INIT_3$, ..., $INIT_N$, indicative of the initialization of each byte of the corresponding application memory segments. Initialization can be performed by a computer program after allocation of a memory space by writing values to application memory.

According to a particular embodiment, the second parts $S1_B$, $S2_B$, $S3_B$, ..., $SN_B$ of the segments $S1_{SM}$, $S2_{SM}$, $S3_{SM}$, ..., $SN_{SM}$ are of the size $sz_{seg}$ bits, with $sz_{seg}$ being the size of a segment in bytes. The first $sz_{seg}$ bits in the second part of each shadow segment track per-byte initialization of bytes of the corresponding segment in the application memory. This is such that the first bit in the second part of the shadow segment tracks initialization of the first byte of the corresponding application segment, the second bit tracks the second byte and so on. In a preferred embodiment of the invention a bit-value of one is indicative of an initialized byte in the application memory and zero denotes an uninitialized byte. In an alternative embodiment zero denotes an initialized byte and one is reserved for uninitialized memory.

The remaining space left in a segment that is not part of the first part or the second part is left unused. It could be used to store any information which can be encoded in the remaining bits.

According to another embodiment of the invention, the first and the second parts of each segment of the shadow memory can be discontinuous.

According to yet another embodiment of the invention, when a program de-allocates an application memory block AM, the corresponding shadow memory block SM is updated by initializing all its content with base values.

Figure 3:
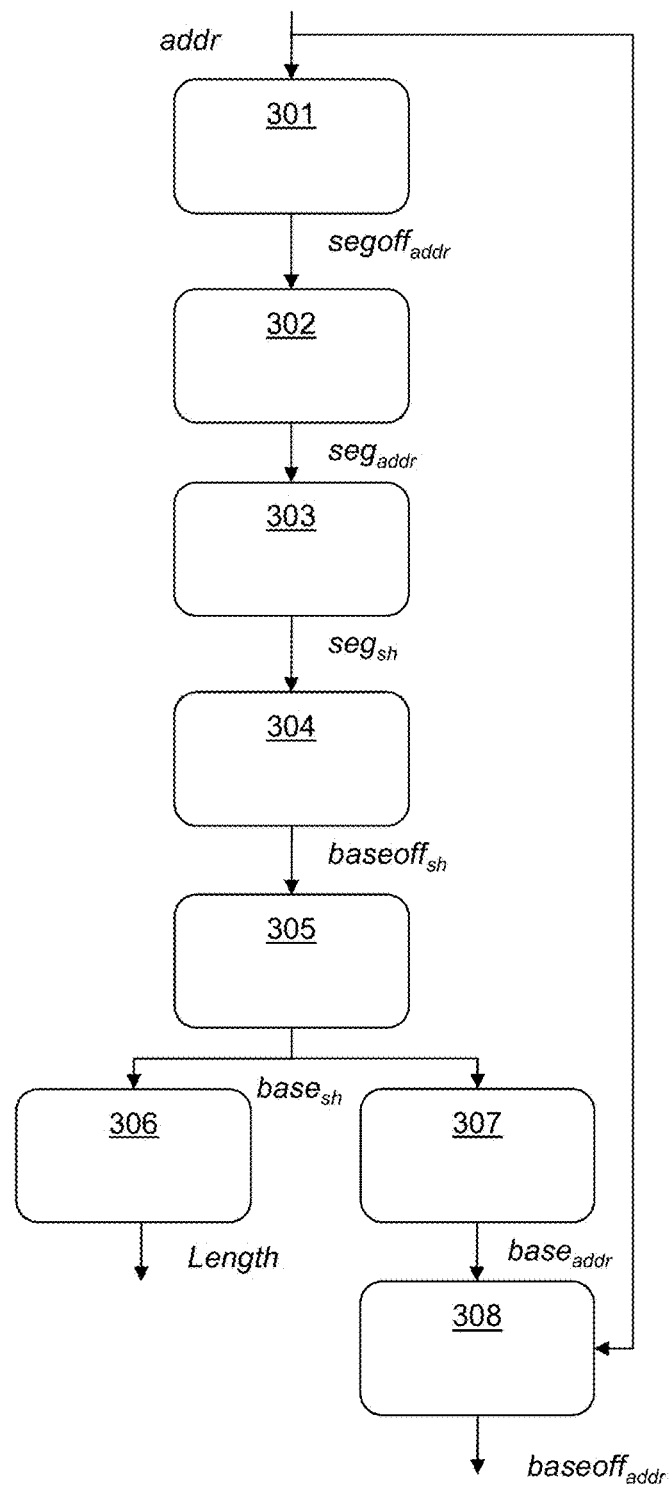
FIG. 3 shows a flowchart of a method for determining properties of a memory address by using shadow state memory according to another embodiment of the invention.
Figure 4:
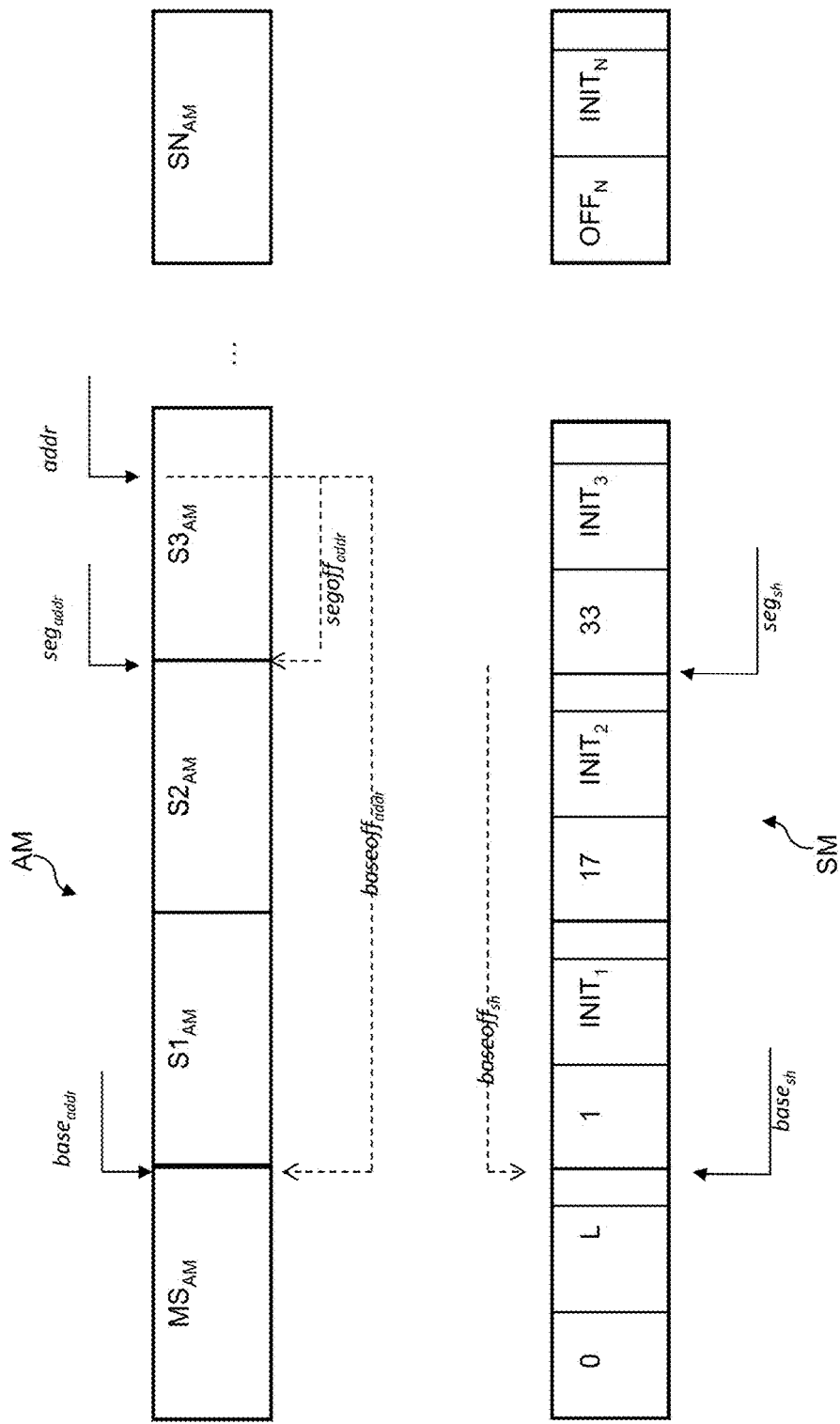
FIG. 4 shows an illustration of a particular use of a shadow memory block when executing the method of FIG. 3.

FIGS. 3 and 4 show a method for determining properties of a memory address by using shadow memory, according to another embodiment of the invention.

Let addr be an address belonging to an application memory block AM having a corresponding shadow memory block SM encoded as described above. FIG. 3 shows the steps of a method for determining properties of address addr including the length of the memory block AM that address addr belongs to, the base address of that memory block AM and the offset of address addr within the memory block AM. All these properties relate to the boundaries of the memory block addr belongs to and the position of address addr within this block.

FIG. 4 represents a particular example where address addr is in segment 3 of memory block AM.

The method described in FIG. 3 begins with step 301 in which the offset of address addr relative to the base address of the segment it belongs to, is computed via the following operation:

$$\text{segoff}_{addr} = \text{addr mod } sz_{seg}$$

where $sz_{seg}$ is the length of a segment expressed in bytes and mod denotes a modulo operation. In a step 302, the base address of the segment addr belongs to is then computed:

$$\text{seg}_{addr} = \text{addr} - \text{segoff}_{addr}$$

In the particular example of FIG. 4, $\text{seg}_{addr}$ is the base address of segment 3.

In a step 303, the corresponding address in the shadow memory block SM of the base address $\text{seg}_{addr}$ is computed:

$$\text{seg}_{sh} = \text{Shadow}(\text{seg}_{addr}),$$

where Shadow(a) is a mapping function translating an application memory address a into a corresponding address in the shadow memory.

In a step 304, the offset of the segment where the address $\text{seg}_{sh}$ lies, relative to the base address of the shadow memory block SM, is computed. If the base value is equal or greater than zero, the offset is computed as follows:

$$\text{baseoff}_{sh} = \text{ReadNum}(\text{seg}_{sh}) - (bv+1),$$

where ReadNum(a) is a function retrieving a number stored in a part of a segment starting with address a and by denotes the base value. In the example depicted in FIG. 4, the above operation returns $\text{baseoff}_{sh} = 33 - 1 = 32$. Alternatively, if the base value used to initialize shadow memory is strictly negative, the operation computed at step 304 is:

$$\text{baseoff}_{sh} = \text{ReadNum}(\text{seg}_{sh})$$

In a step 305, the base address of the shadow memory block $\text{seg}_{sh}$ belongs to is computed:

$$\text{base}_{sh} = \text{seg}_{sh} - \text{baseoff}_{sh}$$

In a step 306, the length of the application memory block addr belongs to is then computed by reading the number stored in the second part of the meta-segment preceding the base address of the shadow memory block. This can be achieved with the following operation.

$$\text{Length} = \text{ReadNum}(\text{base}_{sh} - sz_{seg} + M_W),$$

where $M_W$ denotes the byte-length of the first part of a segment in the shadow memory.

In a step 307, the base address of the application memory block AM that addr belongs to is computed:

$$\text{base}_{addr} = U\text{space}(\text{base}_{sh}),$$

where Uspace(s) is a mapping function translating a shadow memory address s into a corresponding application-space address.

Finally, in a step 308, the byte offset of addr within its memory block AM can be computed:

$$\text{baseoff}_{addr} = \text{addr} - \text{base}_{addr}$$

The method depicted in FIG. 3 can be used to determine properties of an address addr including the length of the memory block that address addr belongs to, the base address of that memory block and the offset of address addr within the memory block.

These properties can then be used to detect memory safety problems including illegal or improper access through address addr to a memory location.

An example of illegal memory access is a pointer trying to access a memory location that was not properly allocated. An example of improper memory access is an access to a properly allocated memory location through a pointer which does not directly point to a memory block containing that location. Knowing the boundaries of the memory block the pointer references and the byte offset of the pointer within this block allows to detect these particular problems.

Figure 5:
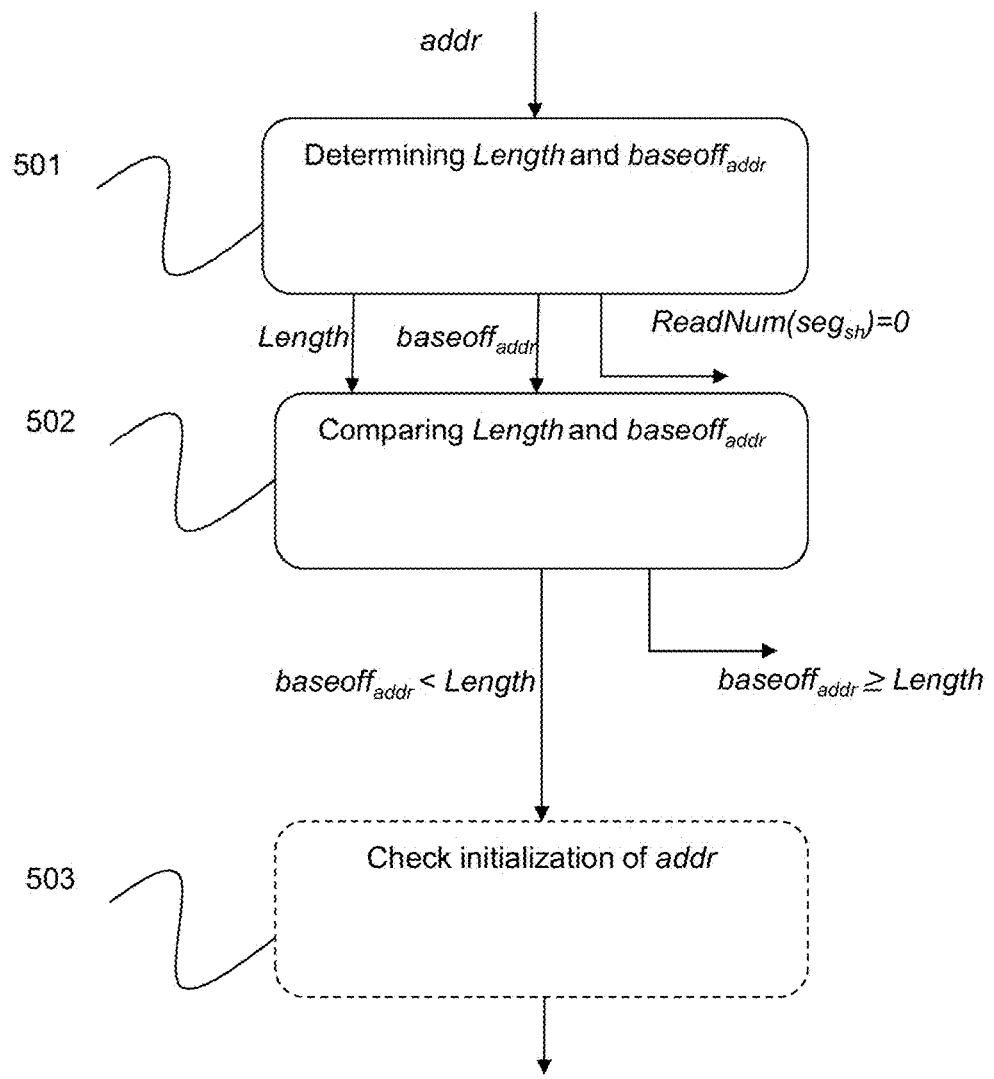
FIG. 5 shows a flowchart of a method for detecting illegal access of memory by a program according to another embodiment of the invention.

FIG. 5 shows a flowchart of an example of a method for detecting illegal or improper access of memory by a program. In this example, a program tries to access a memory location at address addr.

In a first step 501, properties of address addr are computed according to the method depicted in FIG. 3. The step 304 of the method is completed with a test of the value read at address location $\text{seg}_{sh}$ of the shadow memory block. If this value is equal to a base value (for example zero as depicted in FIG. 5), the method is terminated and step 501 concludes that address addr corresponds to an unallocated memory location. If the read value is not equal to a base value, then it means that address addr is in a memory block that was properly allocated.

The method then turns to step 502 in which the offset of address addr within the memory block is compared to the length of the memory block. If the offset $\text{baseoff}_{addr}$ is less than the length of the memory block, then the method concludes that address addr belongs to a memory block that was allocated. If the offset $\text{baseoff}_{addr}$ is equal or larger than the length of the memory block, then the method concludes that the program is trying to access an unallocated memory block.

According to an alternative embodiment of the method of FIG. 5, if the program accesses an address of the form addr+off, then step 502 can be modified to compare the length of the memory block plus $\text{baseoff}_{addr}$ with an offset to determine memory violation problems related to improper memory access. In this case, if $\text{baseoff}_{addr}$+off is greater or equal to the length of the memory block, the method can conclude that an illegal access to memory location addr+off is being performed.

If step 502 concludes with no memory safety problem, then in an optional step 503, the method performs initialization check of address location addr by executing the operation ReadBit($\text{seg}_{sh}+A_W$, $\text{segoff}_{addr}$) and comparing the result with the value used to store initialization information in the shadow memory segments. For example, a value of 1 may mean that the corresponding byte in the segment of the application memory was properly initialized. An initialization check of address addr can be performed in case of a read access to this address. A write access to this location is authorized while a read access is not. When writing in an uninitialized location addr, checking the safety of the write access should be successful, but next an additional step of the method should be performed to modify the shadow memory to store that addr is now initialized.

The function ReadBit (a, N) returns the value stored in the $N_{th}$ bit past a memory address a. Therefore, the operation ReadBit($seg_{sh}+A_W$, $segoff_{addr}$) returns the value stored in bit at position $segoff_{addr}$ in the second part $S3_B$ of segment 3 that is used for initialization purpose.

Figure 6:
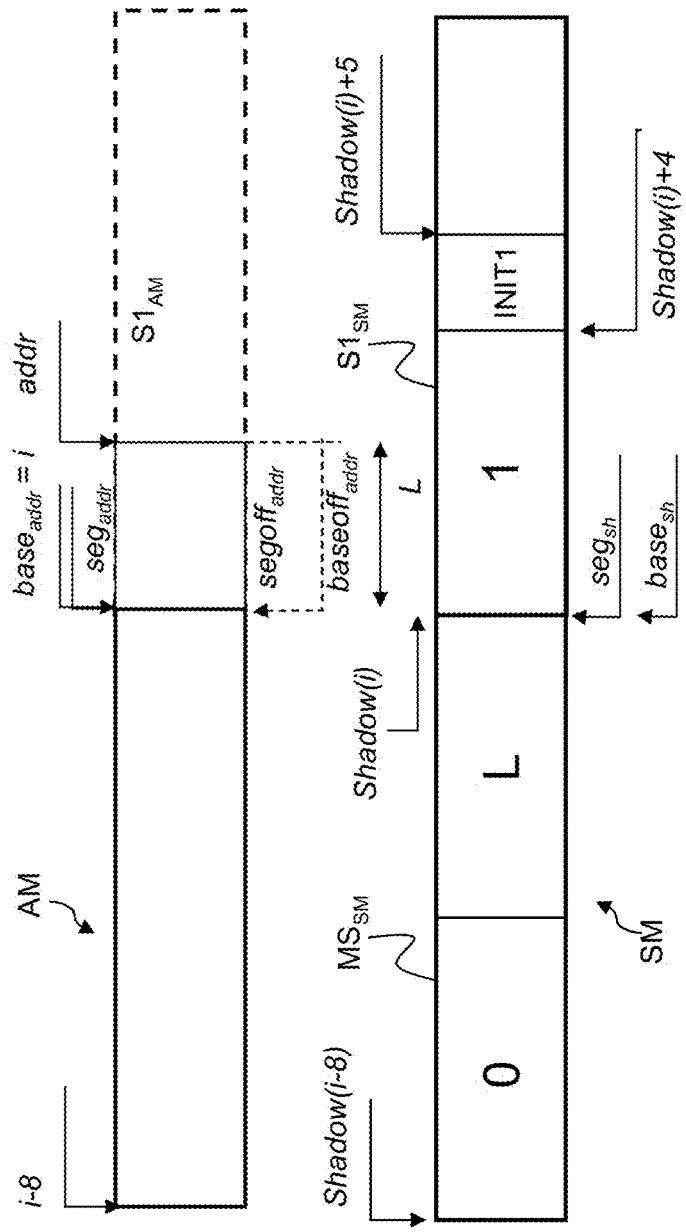
FIG. 6 shows a first example of application of the invention for detecting illegal memory access.

FIG. 6 shows an application of the method depicted in FIG. 5 to a first example showing detection of a write access past the bounds of an allocated buffer.

The first example refers to a particular example program written in the C programming language depicted in Listing 1.

| Listing 1 |
|---|
| 1    #include <stdlib.h> |
| 2    |
| 3    int main(int argc, char **argv) { |
| 4        short *s = malloc(sizeof(short)); |
| 5        int *i= (int*)s; |
| 6        *i=2147483647; |
| 7        free(s); |
| 8    } |

The first example shows how the proposed shadow state encoding method can facilitate detection of illegal memory modification—a memory safety problem where a program writes to a memory location not allocated on its program's heap. One of the aims of this example is to show that the proposed shadow state encoding is capable of addressing problems in memory safety typically handled using byte-level shadowing. In particular this example shows that, given a memory address, the shadow state encoding method according to the invention, can identify whether it belongs to a program's allocation.

The example given in Listing 1 is a program written in the C programming language. The program first allocates a 2-byte heap memory block at Line 4 and aliases it using pointer s. At Line 5 the program declares a 4-byte integer pointer i and makes an alias to the allocated 2-byte heap memory block. Finally, the program writes integer 2147483647 to the memory block whose base address is i and de-allocates the allocated memory via a call to free at Line 7. The program shown in Listing 1 is unsafe as the constant number 2147483647 is represented by 4 bytes, while the memory block pointed to by i at Line 6 is only 2 bytes in length. Consequently the assignment at Line 6 writes 2 bytes past the bounds of the memory block allocated on the heap.

An example shadow state encoding of the memory block allocated at Line 4 (Listing 1) is shown in FIG. 6. The encoding describes the state of the program after executing the statement at Line 5, but before the statement at Line 6 that leads to a memory violation.

FIG. 6 represents an application memory block AM having a length L equal to 2 bytes and corresponding to allocation of a short integer on line 4 of Listing 1. In this particular example, a 32-bit architecture is considered with 8-byte segments and a scale factor of 1. The base value used is 0 and zeros are used to indicate uninitialized bytes. The base address of the memory block AM is pointed to by i (Line 5 of Listing 1). FIG. 6 also shows a shadow memory block SM tracking AM. The size of a segment in this example is equal to 8 bytes. Therefore, the application memory block AM comprises a meta-segment $MS_{AM}$ and a base segment $S1_{AM}$. Similarly, the shadow memory block SM comprises a meta-segment $MS_{SM}$ and a base segment $S1_{SM}$.

The shadow meta segment $MS_{SM}$ has a base address equal to Shadow(i−8) and stores the length L of the allocated block (2 bytes) in its four higher bytes. The base segment $S1_{SM}$ in the shadow memory block SM has a base address equal to Shadow(i) and stores an offset relative to the base address of the block captured by i. Here the offset is incremented by one to avoid confusion with non-allocated areas which store base values equal to zero. The base segment $S1_{SM}$ in the shadow memory block SM also stores per-bit initialization $INIT_1$ of the allocated memory using 8 bits starting at address Shadow(i)+4. Since the memory has been allocated but not initialized by writing to it, all eight initialization bits are zeroes. Since the shadow segment size is 8 bytes, where the first 4 bytes are used to store the offset and the $5^{th}$ byte (8 bits) is used for initialization, the three highest bytes of the base shadow segment $S1_{SM}$ are unused.

An illegal memory access in Listing 1 can be detected using the method shown in FIGS. 3 and 5.

At Line 6 the program requests to write four bytes carrying bit-representation of the integer 2147483647 starting at address i. Therefore locations i, i+1, i+2 and i+3 will be written via the code executed at line 6. Using the computations of the method shown in FIG. 3 one can identify i as the base address of the memory block and determine that its block length is two bytes. Addresses i+2 and i+3 therefore lie outside of a program's heap allocation, thus writing to these addresses will lead to a memory violation.

The following shows an application of the method shown in FIG. 3 to determine block-level properties of address i+3 and detect that it belongs to the unallocated memory space.

First, offset of i+3 relative to the base address of the segment $S1_{AM}$ it belongs to is computed (step 301):

$$segoff_{addr}=(i+3) \bmod 8=3$$

Note, that since i captures the address returned by the allocation function malloc, it is aligned at the boundary of 8 and the above expression thus evaluates to 3.

Then, the base address of the segment i+3 belongs to is computed (step 302):

$$seg_{addr}=i+3-3=i$$

Then, the address shadowing $seg_{addr}$ is computed (step 303):

$$seg_{sh}=\text{Shadow}(i)$$

Then, the offset in the shadow memory block SM relative to the base address of the shadow memory block SM is computed (step 304):

$$baseoff_{sh}=1-1=0$$

Then, the base address of the shadow block $seg_{sh}$ belongs to is computed (step 305):

$$base_{sh}=\text{Shadow}(i)-0=\text{Shadow}(i)$$

Then, the length of the memory block i+3 belongs to is computed (step 306):

$$\text{Length}=\text{ReadNum}(\text{Shadow}(i)-8+4)=2$$

Then, the base address of the memory block i+3 belongs to is computed (step 307):

$$base_{addr} = U space(Shadow(i)) = i$$

Finally the byte offset of address i+3 is computed (step 308):

$$baseoff_{addr} = i+3 - i = 3$$

Finally, applying the method described in FIG. 5, the operation ReadNum(seg$_{sh}$) returns 1 and baseoff$_{addr}$ is greater than the length of the memory block so address i+3 does not belong to the allocated space. Consequently, executing assignment *i=2147483647 at line 6 of Listing 1 leads to a memory violation involving modification of a memory location that has not been allocated by the program.

In a variant of application of the invention, instead of applying the method shown in FIG. 3 to address i+3, the method can be applied to address i to determine that the length of the memory block i belongs to is 2 bytes and its offset within this block is 0 bytes. Then, a variant of the method in FIG. 5 can be applied by comparing offset 3 (from address i+3) to the length of the memory block plus the offset of address i previously determined and arriving to the same conclusion of a memory violation.

Figure 7:
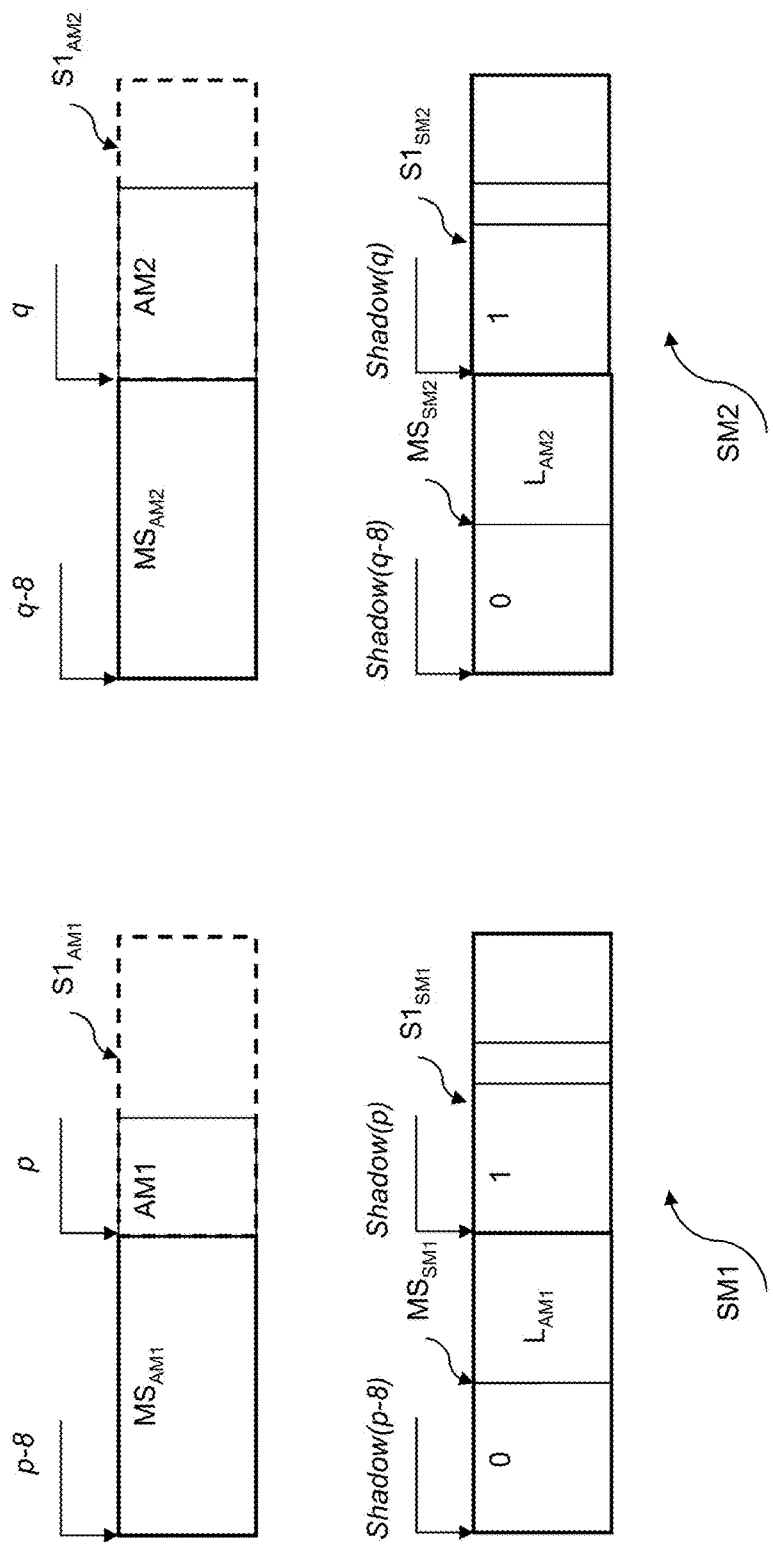
FIG. 7 shows a second example of application of the invention for detecting improper access of memory.

FIG. 7 shows an application of the method depicted in FIG. 5 to a second example involving detection of an improper use of allocated memory.

The second example is a program written in the C programming language given in Listing 2.

| Listing 2 |
| --- |
| 1    #include <stdint.h> |
| 2    #include <stdlib.h> |
| 3 |
| 4    int main( ) { |
| 5        char *p = malloc(3); |
| 6        char *q = malloc(5); |
| 7        int i = (intptr_t)q − (intptr_t)p; |
| 8        *(p+i) = '0'; |
| 9    } |

The example program in Listing 2 shows a scenario involving improper use of allocated heap memory, where an allocated memory location is modified through a pointer that references a memory block which does not contain that location. Such an improper use of allocated memory cannot be detected with shadow memory encoding techniques of the prior art.

In this particular example, a 32-bit architecture is considered with 8-byte segments and a scale factor of 1. The base value used is 0 and zeros are used to indicate uninitialized bytes.

The program in Listing 2 first allocates two heap memory blocks of 3 and 5 bytes at lines 5 and 6 respectively. Further, an operation at Line 7 computes the difference between the base addresses of the memory blocks pointed to by p and q and saves this difference to integer i. Finally, the statement at Line 8 accesses the memory location belonging to a memory block pointed to by q through p and assigns '0' to it. Therefore, p is used to modify a location beyond the memory block it points to. Since (p+i) is also the address of q (which was allocated on the heap), this error cannot be detected via byte-level shadowing techniques of the prior art. This is because tracking memory at a byte-level can only identify whether a memory address belongs to a program's allocation but cannot identify the bounds of the memory block it points to.

FIG. 7 shows a first application memory block AM1 of 3 bytes pointed to by p and a second application memory block AM2 of 5 bytes pointed to by q.

FIG. 7 also shows the corresponding shadow memory blocks SM1 and SM2 each having one meta segment and one base segment of length equal to 8 bytes.

Applying the method of FIG. 3 to pointer p, it can be determined that p belongs to a memory block of length $L_{AM1}$ equal to 3 bytes and its offset is 0 within this block.

The validity of the heap memory modification at address p+i can be determined as follows. The offset of p+i within the memory block AM1 is i. Because heap memory blocks are disjoint, aligned at a boundary of 8 and padded with 8 bytes of unusable memory (meta segments $MS_{AM1}$ and $MS_{AM2}$), the value of i is either greater than 7 (if the base address of the memory block AM1 pointed to by p is less than the base address of the memory block AM2 pointed to by q) or less than −7 otherwise. Then, since the length of memory block AM1 is 3 bytes, the offset of p within this block is 0 byte and i has a value that is either greater than 7 or less than −7, the location p+i lies outside the memory block AM1 of p. In other words, the value of i is either bigger than 3+0 or negative which leads, when executing the method shown in FIG. 5 (with modified step 502), to the conclusion of a buffer overflow via the assignment at Line 8, Listing 2.

Although the various embodiments of the invention have been described in relation to two particular examples of memory safety violations occurring in the C programing language, it should be noted that the invention can be applied to various memory safety issues including heap overflow errors, double free violations, null pointer dereferences. Also, all the embodiments of the invention are not limited to the C programming language but also apply to other programming languages such as C++. The invention can be implemented using source-level instrumentation or binary instrumentation. The invention provides a shadow memory encoding scheme that allows determining properties related to boundaries of allocated memory blocks. These properties can then be used to detect memory safety problems. In some embodiments of the invention, detection of a memory safety problem can trigger a message to the developer at runtime. As such, the invention can be included in a debugging tool for use by programmers.

Additional advantages and modifications will readily appear to those skilled in the art. The invention in its broader aspects is therefore not limited to the specific details, representative methods, and illustrative examples shown and described.

Figure 8:
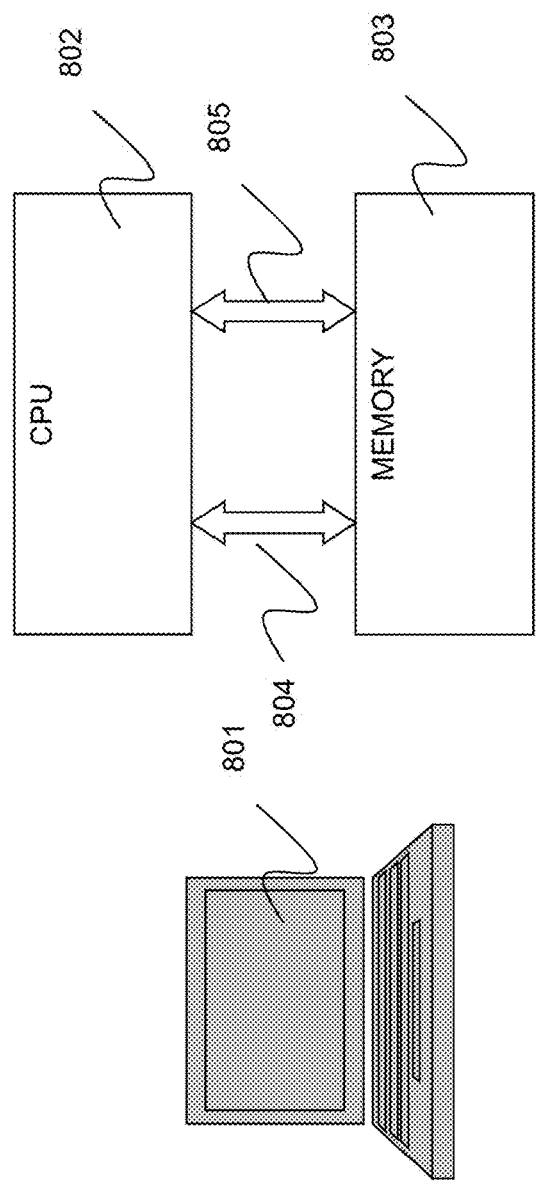
FIG. 8 shows a generic computing system suitable for implementing embodiments of the invention.

FIG. 8 shows a generic computing system suitable for implementing embodiments of the invention comprising a computer 801 or any equivalent computing system. The system 801 comprises a processor 802 and a memory 803. The processor 802 can be a single central processing unit (CPU), or alternatively include multiple processors or cores. The processor can be a 32-bit or 64-bit processor or any equivalent. Computer 801 can be a personal computer, mainframe computer, server or any other computing device. The processor 802 can be any type of device capable of manipulating or processing information. The processor 802 can be, for example, a quantum processor or a general purpose processor or a special purpose processor or an application-specific integrated circuit, programmable logic arrays, programmable logic controller, microcode, firmware, micro-controller, microprocessor, digital signal processor, or any combination of the foregoing, this list being given for a purely illustrative purpose and is not a limitation to the scope of the invention.

Memory 803 can be random access memory (RAM) or any other suitable type of storage device. Generally processor 802 receives program instructions and data from the memory 803 which can be used by processor 802 to perform the embodiments of the invention. Memory 803 can be arranged through a virtual memory space and include heap memory but also stack memory. Memory 803 can be in the same unit as processor 802 as shown or can be located in a separate unit that is coupled to processor 802. Processor 802 can access specific locations in memory by placing the location's address onto an address bus 804. The contents in the specified location of memory 803 are then accessed by processor 802 on a data bus 805. Memory 803 is virtualized so that application programs running on processor 802 can address a virtual memory space as opposed to physical locations within memory 803. The operating system of computer 801 manages this virtual memory space.

Figure 9:
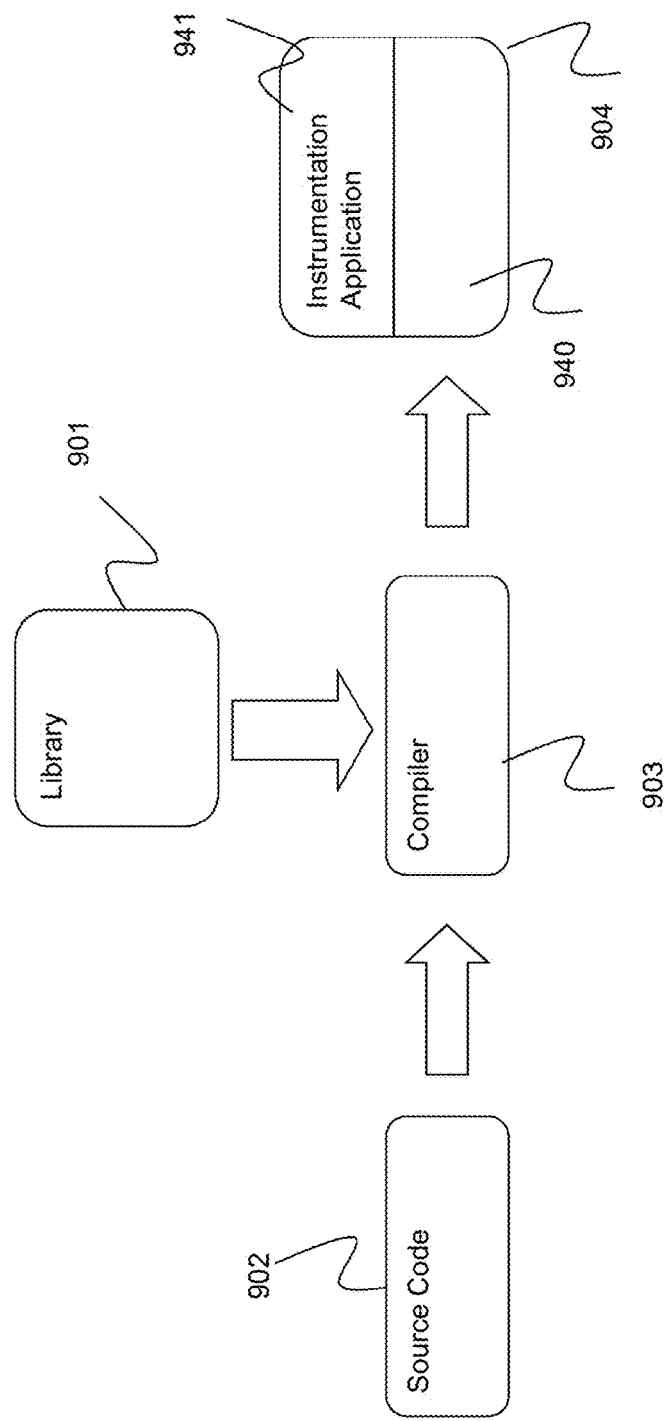
FIG. 9 shows a block diagram of a system including a compiler and instrumentation for performing embodiments of the invention.

FIG. 9 is a block diagram of a system including a compiler 903 that accepts source code 902 as input and generates executable code 904 as output. Executable code 904 includes instrumentation code 941 used in performing embodiments taught herein, such as methods depicted in FIGS. 3 and 5. Source code 902 can be generated by a human programmer using a text editor or programming tool. Code for creating instrumentation code 941 is contained in a library 901 that is accessible by compiler 903. Library 901 is also called run-time library herein. Executable code 904 generated by compiler 903 includes compiled application code 940, also called the application program, into which instrumentation code 941 is inserted. Out-of-bounds accesses to heap memory objects, initialization issues or improper access to allocated memory can be detected using embodiments described herein.

The system depicted in FIG. 9 can be executed by the processor 802 of the computing system 801. In another embodiment, the system of FIG. 9 can be implemented through instrumentation added before the source code is passed to a compiler. In yet another embodiment, the instrumentation can be performed at a binary level, i.e., after compilation.

Generally, all embodiments of the invention can be implemented as a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The term "program" may be used to describe an aspect of computing system implemented to perform a particular function. In some cases, a program may be instantiated via logic device executing machine-readable instructions held by storage device. It will be understood that different modules may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

REFERENCES

[1] R. Hastings and B. Joyce. Purify: Fast detection of memory leaks and access errors. In Proceedings of the Winter USENIX Conference, pages 125-136, January 1992.
[2] J. Seward and N. Nethercote. Using valgrind to detect undefined value errors with bit-precision. In Proceedings of the USENIX Annual Technical Conference, pages 17-30. USENIX, 2005.
[3] W. Cheng, Q. Zhao, B. Yu, and S. Hiroshige. Tainttrace: Efficient flow tracing with dynamic binary rewriting. In Proceedings of the IEEE Symposium on Computers and Communications, pages 749-754. IEEE Computer Society, June 2006.
[4] D. Bruening and Q. Zhao. Practical memory checking with Dr. Memory. In Proceedings of the Annual IEEE/ACM International Symposium on Code Generation and Optimization, CGO '11, pages 213-223, Washington, DC, USA, 2011. IEEE Computer Society.
[5] K. Serebryany, D. Bruening, A. Potapenko, and D. Vyukov. AddressSanitizer: A fast address sanity checker. In Proceedings of the USENIX Annual Technical Conference, pages 309-319. USENIX Association, June 2012,
[6] Q. Zhao, D. Bruening, and S. P. Amarasinghe. Umbra: Efficient and scalable memory shadowing. In Proceedings of the International Symposium on Code Generation and Optimization, pages 22-31. ACM, April 2010.

The invention claimed is:

1. A computer-implemented method for encoding an application memory that a program, executed on a computer, has access to, using a shadow memory corresponding to the application memory, the method comprising:
   creating and initializing a shadow memory divided into a plurality of segments, each segment in the application memory being mapped to a corresponding segment in the shadow memory,
   for each memory block in the application memory that the program allocates, encoding a corresponding shadow memory block, in the shadow memory, by:
      defining a meta segment preceding the first segment of the memory block in the application memory, and a corresponding shadow meta segment in the shadow memory block,
      writing in the shadow meta segment a first value indicative of the size of the memory block,
      writing, in each subsequent segment of the shadow memory block, a second value indicative of the offset between the segment and the first segment of the shadow memory block.

2. The computer-implemented method for encoding an application memory of claim 1 wherein the second value is indicative of the offset from the base address of the shadow memory block to the segment's base address.

3. The computer-implemented method for encoding an application memory of claim 1 wherein a meta segment in the application memory is unallocated.

4. The computer-implemented method for encoding an application memory of claim 1 wherein the shadow memory is initialized with base values being positive or zero.

5. The computer-implemented method for encoding an application memory of claim 4 comprising writing a base value in a first part of the shadow meta segment and the first value indicative of the size of the memory block in a second part of the shadow meta segment.

6. The computer-implemented method for encoding an application memory of claim 4 wherein the base value is zero and the second value is equal to the offset from the base address of the shadow memory block to the segment's base address incremented by one.

7. The computer-implemented method for encoding an application memory of claim 1 wherein the second value is written in a first part of a shadow segment having the same size as the first part of a meta segment.

8. The computer-implemented method for encoding an application memory of claim 7 comprising writing, in a second part of each shadow segment, a third value indicative of the initialization of all bytes of the corresponding segment in the application memory.

9. The computer-implemented method for encoding an application memory of claim 1 wherein the application memory comprises heap memory.

10. The computer-implemented method for encoding an application memory of claim 1 comprising writing base values to the first part of each segment in a shadow memory block when a corresponding memory block in the application memory is de-allocated by the program.

11. A computer-implemented method for detecting illegal memory access by a program executed on a computer having a processor and an application memory, the method comprising:
    creating and initializing a shadow memory divided into a plurality of segments, each segment in the application memory being mapped to a corresponding segment in the shadow memory,
    for each memory block in the application memory that the program allocates, encoding a corresponding shadow memory block, in the shadow memory, by:
        defining a meta segment preceding the first segment of the memory block in the application memory, and a corresponding shadow meta segment in the shadow memory block,
        writing in the shadow meta segment a first value indicative of the size of the memory block,
        writing, in each subsequent segment of the shadow memory block, a second value indicative of the offset between the segment and the first segment of the shadow memory block,
        and, when the program accesses to an address in an application memory block, analyzing the shadow memory block to determine if the access is illegal.

12. The computer-implemented method for detecting illegal memory access of claim 11 wherein analyzing the shadow memory block to determine if the access is illegal comprises determining the length of the memory block and the offset of the address within the memory block.

13. The computer-implemented method for detecting illegal memory access of claim 12 wherein determining if the access is illegal comprises comparing the offset of the address within the memory block and the length of the memory block.

14. The computer-implemented method for detecting illegal memory access of claim 12 wherein the address is equal to a base address plus an offset value and determining if the access is illegal comprises comparing the offset of the base address within the memory block plus the length of the memory block with the offset value.

15. The computer-implemented method for detecting illegal memory access of claim 12 wherein determining if the access is illegal comprises reading the value of the segment offset in the shadow segment to which the address belongs and comparing said value with a base value.

16. The computer-implemented method for detecting illegal memory access of claim 12 wherein determining the length of the memory block comprises:
    determining the offset of the address relative to the base address of the segment it belongs to,
    determining the base address of the segment to which the address belongs,
    determining the base address of the corresponding shadow segment,
    determining the segment offset by reading a value at the base address of the shadow segment,
    determining the base address of the shadow memory block,
    determining the length of the memory block by reading the shadow meta segment of the shadow memory block.

17. The computer-implemented method for detecting illegal memory access of claim 12 wherein determining the offset of the address within the memory block comprises:
    determining the offset of the address relative to the base address of the segment it belongs to,
    determining the base address of the segment to which the address belongs,
    determining the base address of the corresponding shadow segment,
    determining the segment offset by reading a value at the base address of the shadow segment,
    determining the base address of the shadow memory block,
    determining the base address of the corresponding memory block,
    determining the offset of the address within the memory block.

18. The computer-implemented method for detecting illegal memory access of claim 11 comprising determining if the address is initialized by evaluating the third value in the second part of the shadow segment corresponding to the segment to which the address belongs.

19. A system for detecting illegal memory access by a program executed by the system, the system comprising an application memory and a processor configured to execute the steps of a method for encoding an application memory that a program, executed on a computer, has access to, using a shadow memory corresponding to the application memory, the method comprising:
    creating and initializing a shadow memory divided into a plurality of segments, each segment in the application memory being mapped to a corresponding segment in the shadow memory,
    for each memory block in the application memory that the program allocates, encoding a corresponding shadow memory block, in the shadow memory, by:
        defining a meta segment preceding the first segment of the memory block in the application memory, and a corresponding shadow meta segment in the shadow memory block,
        writing in the shadow meta segment a first value indicative of the size of the memory block,
        writing, in each subsequent segment of the shadow memory block, a second value indicative of the offset between the segment and the first segment of the shadow memory block.

20. A computer program product comprising instructions stored on a tangible non-transitory storage medium for executing on a processor a method for encoding an application memory that a program, executed on a computer, has access to, using a shadow memory corresponding to the application memory, the method comprising:

creating and initializing a shadow memory divided into a plurality of segments, each segment in the application memory being mapped to a corresponding segment in the shadow memory, for each memory block in the application memory that the program allocates, encoding a corresponding shadow memory block, in the shadow memory, by:

defining a meta segment preceding the first segment of the memory block in the application memory, and a corresponding shadow meta segment in the shadow memory block, writing in the shadow meta segment a first value indicative of the size of the memory block, writing, in each subsequent segment of the shadow memory block, a second value indicative of the offset between the segment and the first segment of the shadow memory block.

* * * * *